J. P. MULLER.
WINDMILL.
APPLICATION FILED FEB. 6, 1915.
1,178,665.
Patented Apr. 11, 1916.
2 SHEETS—SHEET 1.
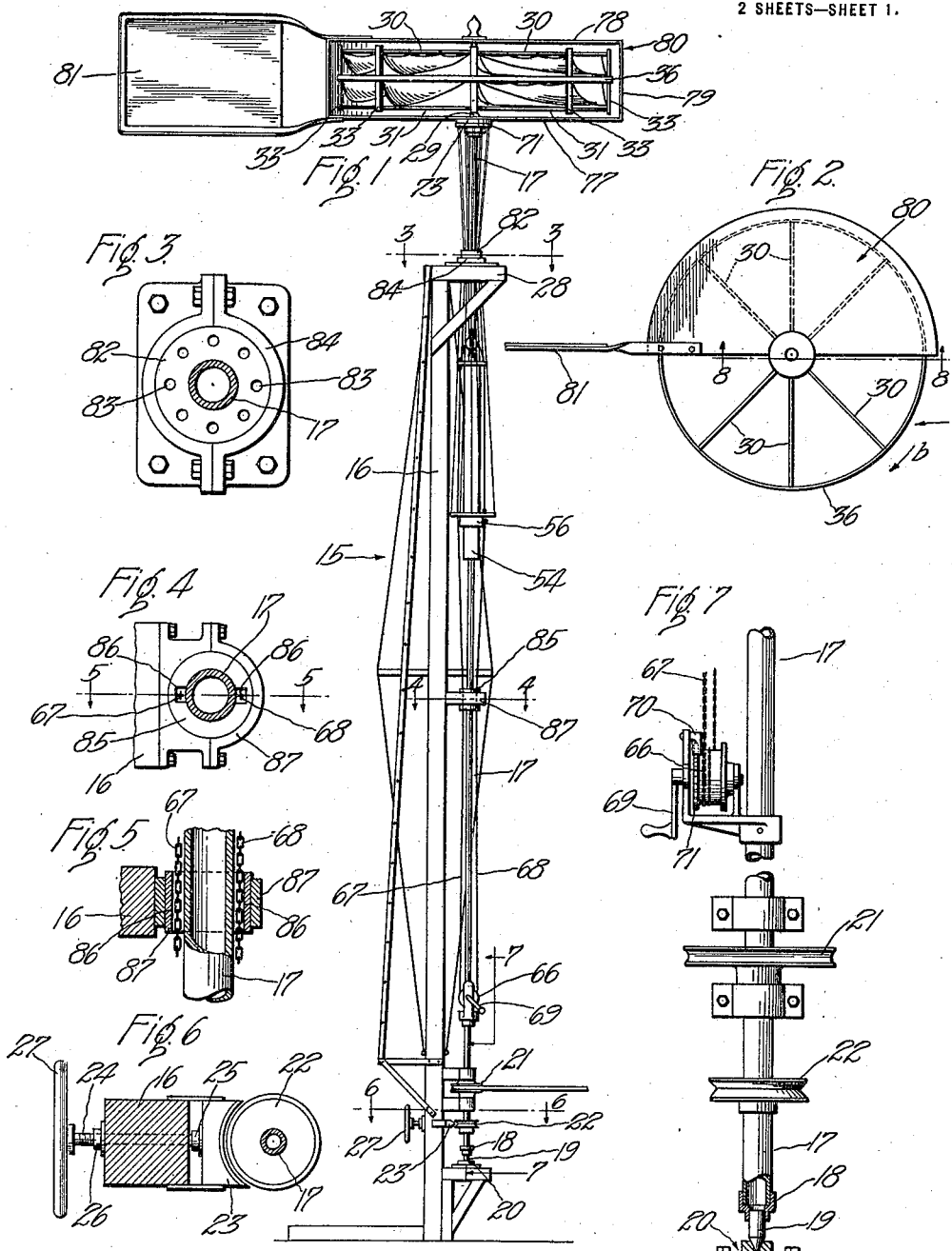
Witnesses
N. L. Connor
E. G. Westburg
Inventor
John Phillip Muller
by R. S. Berry
his Attorney.

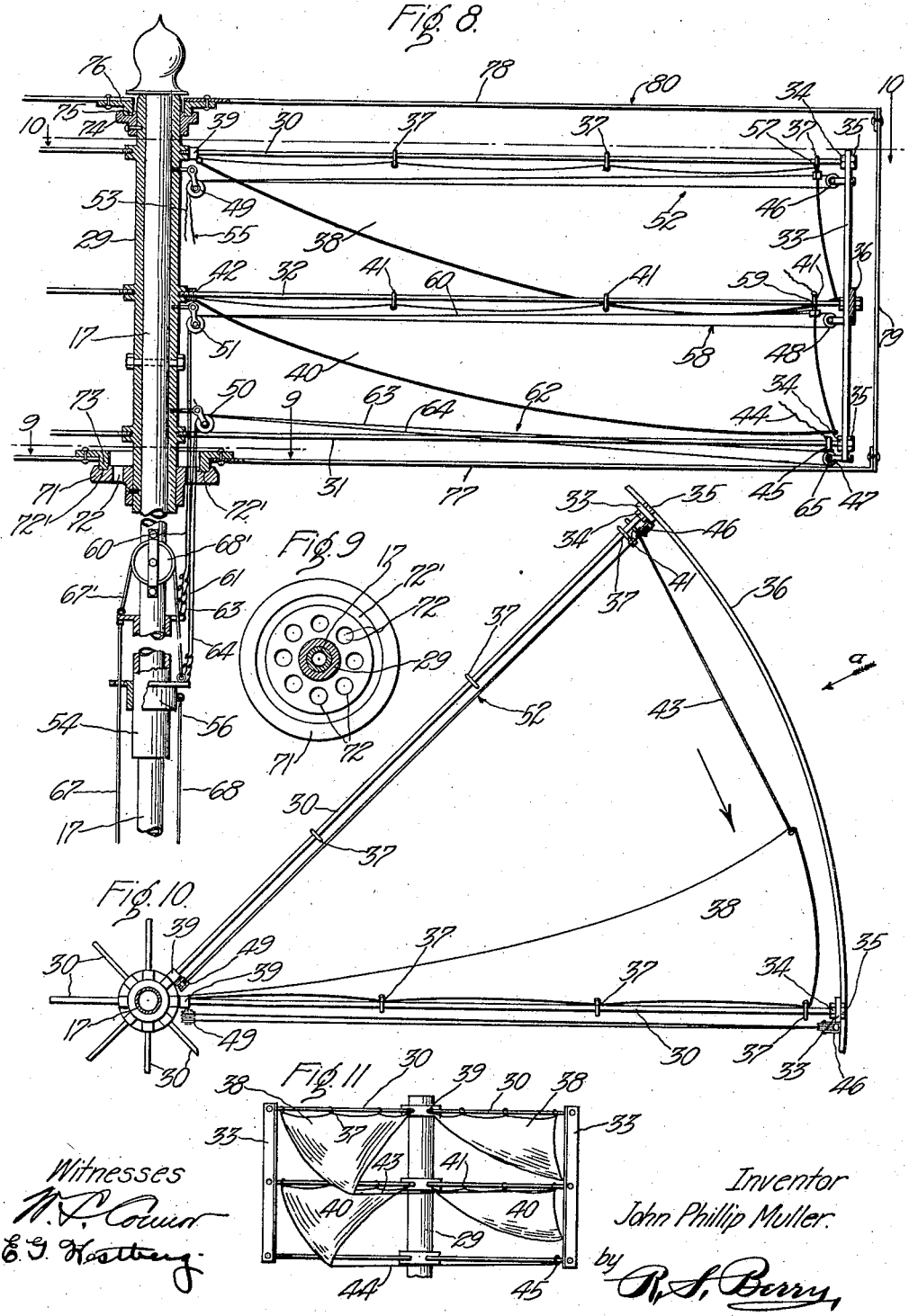

UNITED STATES PATENT OFFICE.

JOHN PHILLIP MULLER, OF SAN FERNANDO, CALIFORNIA.

WINDMILL.

1,178,665.   Specification of Letters Patent.   Patented Apr. 11, 1916.

Application filed February 6, 1915. Serial No. 7,211.

*To all whom it may concern:*

Be it known that I, JOHN PHILLIP MULLER, a citizen of the United States, residing at San Fernando, in the county of Los Angeles, State of California, have invented new and useful Improvements in Windmills, of which the following is a specification.

This invention relates to a wind-mill.

It is the object of this invention to provide a wind-mill embodying a horizontally revoluble member fitted with a plurality of sails adapted to be furled and adjusted in various positions to regulate the speed of rotation of the revoluble member according to wind velocity.

A further object is to provide means for adjusting the positions of a plurality of sails from a remote point in a single operation.

Another object is to provide a wind-mill having a rotary element carrying a series of radially disposed sails adapted to be shifted on their supports to vary the exposed sail area by means of adjusting cables and which is fitted with a wind-shield arranged to encompass one-half of the rotary element and adapted to be shifted according to the direction of the air currents independently of the rotary element.

A further object is to provide a construction whereby the wind-shield and the sail carrying rotary elements may revolve independent of each other without interfering with the sail adjusting cables.

The invention is illustrated in the accompanying drawings in which;

Figure 1 is a view of the wind-mill in side elevation. Fig. 2 is a plan view of same. Fig. 3 is an enlarged horizontal section on the line 3—3 of Fig. 1. Fig. 4 is an enlarged horizontal section on the line 4—4 of Fig. 1. Fig. 5 is a view in vertical section on the line 5—5 of Fig. 4. Fig 6 is a detail horizontal section on the line 6—6 of Fig. 1. Fig. 7 is an enlarged vertical section and elevation on the line 7—7 of Fig. 1, as seen in the direction indicated by the arrows. Fig. 8 is a view illustrating the rotary wind mill head as seen on the line 8—8 of Fig. 2 in the direction indicated by the arrows. Fig. 9 is a view in horizontal section on the line 9—9 of Fig. 8. Fig. 10 is a detailed plan view as seen on the line 10—10 of Fig. 8. Fig. 11 is a detail in elevation on a reduced scale as seen in the direction indicated by the arrow *a* in Fig. 10.

More specifically 15 indicates the windmill standard or derrick which may be of any suitable construction but is here shown as consisting of a vertically disposed and suitably braced post 16, forming a support for a rotary shaft 17. The shaft 17 is preferably of tubular formation for the purpose of lightness and strength and is fitted at its lower end with a reduced coupling 18, carrying a conical spindle 19 seated in a bearing 20, as particularly shown in Fig. 7. The shaft 17 is fitted with a belt wheel 21 or other suitable transmission means by which rotary movement of the shaft 17 may be utilized to operate any desired mechanism. The shaft 17 is also provided with a brake-drum 22 adapted to be engaged by a brake-shoe 23 by means of which movement of the shaft 17 may be retarded or stopped as desired. The brake-shoe 23 is guided on the post 16 and is connected to a threaded shaft 24 by a swivel joint 25; the threaded shaft 24 extending through the post 16 and through an internally threaded bearing 26 and having a hand-wheel 27 on its outer end by means of which the shaft 24 may be rotated and advanced longitudinally in its bearing 26 to move the brake-shoe 23 in and out of contact with the brake-drum 22.

The upper end of the shaft extends above a platform 28 on the top of the post 16 and has a tubular hub 29 rigidly attached thereto. The hub 29 is provided with a series of radially extending arms 30 adjacent its upper end and has a corresponding series of arms 31 adjacent its lower end with a third series of arms 32 intermediate the arms 30 and 31. Any suitable number of the radial arms may be employed as desired and each set of arms may be disposed in any desired position in relation to each other but the arms 30, 31, and 32 are here shown as arranged in vertical alinement. The arms 30, 31 and 32 are here shown as consisting of rods, the inner ends of which are threaded and screwed into engagement with the hub 29 and having their outer ends threaded and extending through vertical bars 33 and connected to the latter by means of nuts 34 and 35 threaded on the arms on the opposite sides of the bar 33 as shown in Fig. 8; the bar 33 forming a connection between the outer ends of the arms 31 and 32 and holding them in spaced parallel relation to each other. As a means for holding the arms against lateral bending, the bars 33 are secured to a hoop 36 in any suitable manner.

Slidably mounted on each arm 30 is a series of rings 37 connected at intervals to the upper edge of a dependent triangular-shaped sail 38 the inner convergent end of which is rigidly attached by a fastener 39 to the arm 30. The sails 38 are adapted to extend approximately the length of the arms 30 when unfurled and are designed to be folded and disposed adjacent the hub 29 or adjusted in various positions on the arms 30.

A corresponding sail 40 is mounted on each arm 32 by means of slidable rings 41 with its inner end attached to the inner end of the arm 32 by a fastening 42. The lower outer end of each sail 38 is connected by a cord 43 to the end ring 41 on the sail 40 carried by the intermediate arm 32 on the adjacent series of radial arms as particularly shown in Fig. 10 and the lower end of the sail 40 is connected by means of a cord 44 to a ring 45 slidably mounted on the radial arm 31 of the adjacent series of arms, as shown in Fig. 11. By this arrangement the sails, when in their extended position, will be disposed at an inclination as shown in Fig. 11.

Mounted on the bars 33 adjacent the outer ends of the arms 30, 31 and 32 are single sheave pulleys 46, 47 and 48 and mounted on the hub 29 at the inner ends of the arms 30, 31 and 32 are double sheave pulleys 49, 50 and 51. Passing around the pulley 46 is a cord 52, which is rove over the pulley 49 and passes down along-side the hub 29 and shaft 17. One end 53 of the cord 52, is connected to a sleeve 54 slidably mounted on the shaft 17, and the other end portion 55 of the cord 52 connects with a second sleeve 56 slidably mounted on the sleeve 54. The end portion 53 of the cord 52 is secured at 57 to the end ring 37 on the sail 38 as shown in Fig. 8.

A cord 58 passes around the pulley 48 and is connected at 59 to the ring 41 at the outer end of the sail 40 to which the lower end of the adjacent sail is connected. The cord 58 passes over the pulleys 51 and the end portion 60 thereof which connects with the sail 40 is attached to the sleeve 54 and the end portion 61 connects with the sleeve 56.

A cord 62 passes around the pulley 47 and is rove over the pulley 50 with the end portion 63 thereof attached to the sleeve 54 and its end portion 64 attached to the sleeve 56 with the end portion 63 connecting at 65 to the ring 45 on the arm 31 to which the lower end of the sail 40 is attached.

The sleeves 54 and 56 are adapted to be shifted in opposite directions simultaneously to effect the furling or unfurling of the sails 38 and 40 throughout the wind-mill. This shifting of the sleeves 54 and 56 is effected by means of a cable or chain which passes around a drum 66 supported in suitable bearings rigidly mounted on the shaft 17; one end portion 67 of the chain connecting with the sleeve 54 and the other end portion 68 connecting with the sleeve 56. The drum 66 is fitted with a hand-crank 69 by means of which it may be rotated to wind one portion of the chain thereon while the other portion unwinds therefrom. A cable or chain 67' is connected at its ends to the sleeves 54 and 56 and passes over a pulley 68' mounted on the shaft 17; the chain 67' serving to equalize pull on the sleeves 54 and 56 and operating to move one sleeve upwardly when the other sleeve is pulled downwardly. A pawl 70 is arranged to engage teeth 71 on the drum 66 to hold the latter against rotation and thereby retain the sails 38 and 40 in their adjusted positions.

Rigidly mounted on the lower end of the hub 29 is an annular flange 71 which is formed with perforations 72 through which the sail adjusting cords are passed, and formed on the upper face of the flange 71 concentric with the center of the shaft 17 is an annular channel 72' in which a ring 73 is revolubly seated.

Mounted on the upper end of the hub 29 is a flange 74 having an annular channel 75 on its upper face forming a seat for a ring 76. Mounted on the rings 73 and 76 are corresponding semi-circular plates 77 and 78 which extend outwardly to a point a short distance beyond the outer ends of the arms 31 and 32 and are connected at their arcuate edges to a semi-cylindrical vertical wall 79. The plates 77 and 78 and the wall 79 form a housing 80 which incloses one-half of the wind-wheel as shown in Fig. 2.

Mounted on the housing 80 and extending in alinement with the open side thereof is a vertical vane 81 which is adapted to be operated by the wind to position the housing 80 with the open side thereof extending in the direction of the air-current so that one-half of the wind-wheel will be exposed to the action of the wind.

The shaft 17 is fitted with a collar 82 adjacent to the platform 28 which collar is formed with perforations 83 through which the sail adjusting cables are passed and this collar 82 is engaged in a bearing 84 as particularly shown in Fig. 3. The collar 82 is provided with perforation 83 for each set of cables for adjusting each pair of superposed sails. This arrangement prevents the cables from becoming entangled and also prevents their interfering with the rotation of the wind-guard or housing 80.

A collar 85 is mounted on the shaft 17 beneath the slidable sleeves 54 and 56 and is formed with openings 86 through which end portions 67 and 68 of the chain pass; the collar 85 being mounted in a bearing 87 as particularly shown in Figs. 4 and 5. Any number of collars 85 and bearings 87 may be employed throughout the length of the shaft 17 as occasion may require.

In the operation of the invention, when it is desired to adjust the sails 38 and 40, the pawl 70 is disengaged from the teeth 71 on the drum 66 and the latter is rotated by means of the crank 69 and thereby caused to operate on the chain wound therearound to wind one end portion thereof on the drum and unwind the other end portion therefrom, thus causing one of the sleeves 54 and 56 to move downwardly on the shaft 17 and move the other sleeve through the chain 67' upwardly thereon. This movement of the sleeves 54 and 56 operates on the cables connected therewith to shift the outer ends of the sails 38 and 40 either outwardly or inwardly according to the direction of rotation of the drum 66; the sails being disposed in the outermost position when the velocity of the wind is low and arranged at various intermediate positions when the wind velocity is increased. This adjustment of the sails is provided for the purpose of regulating the speed of rotation of the shaft 17.

It is necessary to stop the rotation of the shaft 17 to effect the adjustment of the sails. This is accomplished by means of the brake-shoe 23 which is moved into contact with the brake-drum 22 by operating the hand-wheel 27 as before described.

By providing the wind-shield or housing 80 only one-half of the wind-wheel would be exposed to the action of the wind; the housing 80 being positioned by the action of the air-current on the vane 81 so that the wind will operate on the wind-wheel to rotate the latter in the direction indicated by the arrow $b$ in Fig. 2.

While I have shown the wind-wheel as provided with two sets of radially extending sails it is manifest that this number may be increased or diminished as occasion may require, and that the number of sails in a set may be varied according to requirements.

What I claim is:

1. In a wind-mill, a revoluble shaft, a plurality of horizontally and radially extending arms carried by said shaft, sails depending from said arms having their inner ends fixed, and means operable from a remote point for simultaneously advancing and retracting the outer ends of said sails in radial relation to the shaft.

2. In a wind-mill, a rotary shaft, a plurality of radially extending and horizontally disposed arms carried by said shaft, sails depending from said arms having their inner ends fixed and having their outer portions slidable longitudinally on the arms, cords attached to the outer ends of said sails, a pair of sleeves slidably mounted on the shaft to which said cords are attached, a drum carried by said shaft, and a chain wound on said drum having its ends connected to said sleeves whereby rotation of the drum will operate to move said sleeves in opposite directions in relation to each other to adjust the positions of the sails.

3. In a wind-mill, a rotary shaft, a plurality of radially extending and horizontally disposed arms carried by said shaft, sails depending from said arms having their inner ends fixed with their outer portions slidable longitudinally on the arms, cords attached to the outer ends of said sails, a pair of sleeves slidably mounted on the shaft to which said cords are attached, a drum carried by said shaft, a chain wound on said drum having its ends connected to said sleeves whereby rotation of the drum will operate to move said sleeves in opposite directions in relation to each other to adjust the positions of the sails, and means engageable with said drum for holding the sails in their adjusted position.

4. In a wind-mill, a revoluble shaft, a plurality of horizontally and radially extending arms carried by said shaft, sails depending from said arms having their inner ends fixed, means operable from a remote point for simultaneously advancing and retracting the outer ends of said sails in radial relation to the shaft, and means for holding the sails in various adjusted positions.

5. In a wind-mill, a vertically disposed rotary shaft, a hub thereon, a series of radially extending arms on said hub, radially disposed depending sails on said arms having their inner ends fixed and their outer ends slidable on the arms, a wind-shield having a semi-cylindrical wall disposed adjacent the ends of the sails, a mounting for said wind-shield whereby it may rotate independent of the shaft, and means for radially adjusting the sails simultaneously on said arms from a remote point.

6. In a wind-mill, a vertical rotary shaft, a hub on said shaft, radially extending arms on said hub, sails carried by said arms, having their inner ends fixed and their outer ends slidable on the arms, a flange on said hub formed with perforations, cables attached to the sails passing through said perforations, a ring mounted to rotate on said flange, and a semi-cylindrical wind-shield carried by said ring, encompassing approximately one-half the wind-wheel formed by the radial arms and sails.

7. In a wind-mill, a rotatable shaft, a series of radial arms carried by said shaft, dependent sails on said arms having their inner ends fixed, pulleys disposed near the inner and outer ends of said arms, cords rove around said pulleys and attached to the outer ends of the sails, a sleeve slidable on the shaft to which one end of each cord is attached, a second sleeve to which the other end of each cord is attached, a drum carried on the shaft, and connections between said drum and sleeves whereby rotation of the drum will move the sleeves in opposite directions in relation to each other to simultaneously advance or retract the sails.

8. In a wind-mill, a rotatable shaft, a plurality of radially extending arms on said shaft, a depending sail carried by each of said arms, a pulley wheel at each end of each arm, cords passing around said pulleys and connected to the outer ends of the sails, a sleeve on the shaft to which one end of each cord is attached, a second sleeve to which the other end of each cord is attached, a drum carried by said shaft, connections between said drum and sleeves whereby rotation of the drum will cause the sleeves to move in opposite directions and thereby cause the plurality of sails to move inwardly or outwardly on the arms in unison, and means engageable with the drum operating to retain the sails in various adjusted positions.

9. In a wind-mill having a rotary shaft and a plurality of radially adjustable sails thereon, cords for adjusting the sails, a collar on said shaft formed with perforations through which said cords are passed, a bearing in which said collar is journaled, and means on said shaft below the collar operating on said cords whereby the sails may be adjusted simultaneously.

In witness that I claim the foregoing I have hereunto subscribed my name this 25th day of January, 1915.

JOHN PHILLIP MULLER.

Witnesses:
R. S. BERRY,
J. L. GELLER.

Copies of this patent may be obtained for five cents each, by addressing the "Commissioner of Patents, Washington, D. C."